United States Patent
Yamane et al.

(10) Patent No.: US 11,440,194 B2
(45) Date of Patent: Sep. 13, 2022

(54) PHYSICAL HUMAN-ROBOT INTERACTION (PHRI)

(71) Applicant: Honda Motor Co., Ltd., Tokyo (JP)

(72) Inventors: Katsu Yamane, Mountain View, CA (US); Joseph A. Campbell, Chandler, AZ (US)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 16/817,033

(22) Filed: Mar. 12, 2020

(65) Prior Publication Data

US 2021/0078178 A1   Mar. 18, 2021

Related U.S. Application Data

(60) Provisional application No. 62/899,933, filed on Sep. 13, 2019.

(51) Int. Cl.
   *B25J 9/16* (2006.01)
   *B25J 11/00* (2006.01)
   (Continued)

(52) U.S. Cl.
   CPC ........... *B25J 9/1694* (2013.01); *B25J 9/12* (2013.01); *B25J 9/161* (2013.01); *B25J 9/163* (2013.01);
   (Continued)

(58) Field of Classification Search
   CPC ... B25J 9/1694; B25J 9/12; B25J 9/161; B25J 9/163; B25J 11/0005; B25J 13/085;
   (Continued)

(56) References Cited

U.S. PATENT DOCUMENTS

| 6,353,814 | B1 * | 3/2002 | Weng | G06K 9/6219 |
| | | | | 700/258 |
| 7,249,117 | B2 * | 7/2007 | Estes | G06N 5/022 |
| | | | | 706/18 |

(Continued)

OTHER PUBLICATIONS

Simão et al., Using data dimensionality reduction for recognition of incomplete dynamic gestures, 2017, ELSEVIER, Pattern Recognition Letters, vol. 99, pp. 32-38, ISSN 0167-8655, https://doi.org/10.1016/j.patrec.2017.01.003 (Year: 2017).*

(Continued)

*Primary Examiner* — Jaime Figueroa
(74) *Attorney, Agent, or Firm* — Rankin, Hill & Clark LLP

(57) ABSTRACT

A robot for physical human-robot interaction may include a number of sensors, a processor, a controller, an actuator, and a joint. The sensors may receive a corresponding number of sensor measurements. The processor may reduce a dimensionality of the number of sensor measurements based on temporal sparsity associated with the number of sensors and spatial sparsity associated with the number of sensors and generate an updated sensor measurement dataset. The processor may receive an action associated with a human involved in pHRI with the robot. The processor may generate a response for the robot based on the updated sensor measurement dataset and the action. The controller may implement the response via an actuator within a joint of the robot.

20 Claims, 5 Drawing Sheets

(51) Int. Cl.
    *B25J 13/08*   (2006.01)
    *B25J 19/02*   (2006.01)
    *B25J 9/12*    (2006.01)
    *B25J 9/00*    (2006.01)

(52) U.S. Cl.
    CPC ......... *B25J 11/0005* (2013.01); *B25J 13/085* (2013.01); *B25J 19/02* (2013.01); *B25J 9/0006* (2013.01)

(58) Field of Classification Search
    CPC ........ B25J 19/02; B25J 9/0006; B25J 19/023; G05B 2219/40202; G05B 2219/40413; G05B 2219/40414
    USPC .................................................. 700/245–264
    See application file for complete search history.

(56) References Cited

U.S. PATENT DOCUMENTS

| | | | | |
|---|---|---|---|---|
| 7,848,566 | B2* | 12/2010 | Schneiderman | G06K 9/6227 382/224 |
| 8,401,283 | B2* | 3/2013 | Sabe | G06K 9/6256 382/159 |
| 9,129,158 | B1* | 9/2015 | Medasani | G06V 20/41 |
| 9,256,966 | B2* | 2/2016 | Jacobs | A61B 5/055 |
| 9,373,038 | B2* | 6/2016 | Richert | G06N 3/08 |
| 9,495,591 | B2* | 11/2016 | Visser | H04R 3/00 |
| 9,539,726 | B2* | 1/2017 | Simaan | A61B 34/35 |
| 10,572,679 | B2* | 2/2020 | Frank | G06F 16/24578 |
| 10,913,152 | B2* | 2/2021 | Rozo | G06N 7/005 |
| 10,955,811 | B2* | 3/2021 | Nagarajan | G06K 7/0004 |
| 2005/0223176 | A1* | 10/2005 | Peters, II | B25J 13/00 711/141 |
| 2006/0088207 | A1* | 4/2006 | Schneiderman | G06V 40/164 382/228 |
| 2007/0087756 | A1* | 4/2007 | Hoffberg | G06Q 20/065 455/450 |
| 2007/0203693 | A1* | 8/2007 | Estes | G06F 16/2425 704/9 |
| 2009/0254236 | A1* | 10/2009 | Peters, II | G05D 1/0274 701/28 |
| 2010/0174514 | A1* | 7/2010 | Melkumyan | G06F 17/18 703/2 |
| 2013/0322728 | A1* | 12/2013 | Jacobs | A61B 5/055 382/132 |
| 2015/0242690 | A1* | 8/2015 | Richert | G06N 3/08 382/103 |
| 2016/0224803 | A1* | 8/2016 | Frank | G06F 21/6245 |
| 2016/0242690 | A1* | 8/2016 | Principe | A61B 5/316 |
| 2016/0328253 | A1* | 11/2016 | Majumdar | G06N 10/00 |
| 2017/0365277 | A1* | 12/2017 | Park | G10L 15/063 |
| 2018/0204111 | A1* | 7/2018 | Zadeh | G06N 3/0436 |
| 2020/0246980 | A1* | 8/2020 | Kuppuswamy | B25J 19/023 |
| 2020/0384639 | A1* | 12/2020 | Rozo | G06N 7/005 |

OTHER PUBLICATIONS

Ganguly et al., Compressed Sensing, Sparsity, and Dimensionality in Neuronal Information Processing and Data Analysis, 2012, Annual Reviews, Neuroscience, 35:485-508; doi: 10.1146/annurev-neuro-062111-150410 (Year: 2012).*

Wu et al., Multimodal Sparse Representation for Anomaly Classification in A Robot Introspection System, 2018, IEEE, International Conference on Robotics and Biomimetics Dec. 12-15, Kuala Lumpur, Malaysia, pp. 1594-1600. (Year: 2018).*

Zheng et al., Spatial-Temporal Data Collection with Compressive Sensing in Mobile Sensor Networks, 2017, Sensors 17, No. 11: 2575. https://doi.org/10.3390/s17112575 pp. 1-22 (Year: 2017).*

B. D. Argall and A. G. Billard, "A survey of tactile human-robot interactions," Robotics and autonomous systems, vol. 58, No. 10, pp. 1159-1176, 2010.

A. E. Block and K. J. Kuchenbecker, "Emotionally supporting humans through robot hugs," in Companion of the 2018 ACM/IEEE International Conference on Human-Robot Interaction. ACM, 2018, pp. 293-294.

S. Calinon, P. Evrard, E. Gribovskaya, A. Billard, and A. Kheddar, "Learning collaborative manipulation tasks by demonstration using a haptic interface," in 2009 International Conference on Advanced Robotics. IEEE, 2009, pp. 1-6.

J. Campbell and H. Ben Amor, "Bayesian interaction primitives: A slam approach to human-robot interaction," in Conference on Robot Learning, 2017, pp. 379-387.

J. Campbell, S. Stepputtis, and H. Ben Amor, "Probabilistic multimodal modeling for human-robot interaction tasks," 2019.

Z. Cao, G. Hidalgo, T. Simon, S.-E. Wei, and Y. Sheikh, "OpenPose: realtime multi-person 2D pose estimation using Part Affinity Fields," in arXiv preprint arXiv:1812.08008, 2018.

S. Chen, C. F. Cowan, and P. M. Grant, "Orthogonal least squares learning algorithm for radial basis function networks," IEEE Transactions on neural networks, vol. 2, No. 2, pp. 302-309, 1991.

Franka Emika GmbH, "Introducing the Franka Emika robot," https://www.franka.de/.

N. Hogan, "Impedance control: An approach to manipulation," in 1984 American control conference. IEEE, 1984, p. 304-313.

InertialLabs, "Miniature and subminiature orientation sensors," https://inertiallabs.com/3os.html.

A. Kaplish and K. Yamane, "Motion regargeting and control for teleoperated physical human-robot interaction," in IEEE-RAS International Conference on Humanoid Robots, 2019 (in press).

A. Kraskov, H. Stogbauer, and P. Grassberger, "Estimating mutual information," Physical review E, vol. 69, No. 6, p. 066138, 2004.

N. Kwak and C.-H. Choi, "Input feature selection by mutual information based on parzen window," IEEE Transactions on Pattern Analysis & Machine Intelligence, No. 12, pp. 1667-1671, 2002.

T. Miyashita, T. Tajika, H. Ishiguro, K. Kogure, and N. Hagita, "Haptic communication between humans and robots," in Robotics Research Springer, 2007, pp. 525-536.

F. Mueller, F. Vetere, M. R. Gibbs, J. Kjeldskov, S. Pedell, and S. Howard, "Hug over a distance," in CHI'05 extended abstracts on Human factors in computing systems. ACM, 2005, pp. 1673-1676.

H. Peng, F. Long, and C. Ding, "Feature selection based on mutual information: criteria of max-dependency, max-relevance, and min-redundancy," IEEE Transactions on Pattern Analysis & Machine Intelligence, No. 8, pp. 1226-1238, 2005.

L. Peternel and J. Babič, "Learning of compliant human-robot interaction using full-body haptic interface," Advanced Robotics, vol. 27, No. 13, pp. 1003-1012, 2013.

B. C. Ross, "Mutual information between discrete and continuous data sets," PloS one, vol. 9, No. 2, p. e87357, 2014.

L. Rozo, S. Calinon, D. G. Caldwell, P. Jimenez, and C. Torras, "Learning physical collaborative robot behaviors from human demonstrations," IEEE Transactions on Robotics, vol. 32, No. 3, pp. 513-527, 2016.

D. Rus and M. T. Tolley, "Design, fabrication and control of soft robots," Nature, vol. 521, No. 7553, p. 467, 2015.

M. Shiomi, A. Nakata, M. Kanbara, and N. Hagita, "A robot that encourages self-disclosure by hug," in International Conference on Social Robotics. Springer, 2017, pp. 324 333.

J. K. S. Teh, A. D. Cheok, R. L. Peiris, Y. Choi, V. Thuong, and S. Lai, "Huggy pajama: a mobile parent and child hugging communication system," in Proceedings of the 7th international conference on Interaction design and children. ACM, 2008, pp. 250-257.

Touchence Inc., "ShokacPot/ShokacCube product outline," http://www.touchence.jp/en/cube/index.html.

J. R. Vergara and P. A. Estévez, "A review of feature selection methods based on mutual information," Neural computing and applications, vol. 24, No. 1, pp. 175-186, 2014.

K. Wada, T. Shibata, T. Saito, and K. Tanie, "Effects of robot-assisted activity for elderly people and nurses at a day service center," Proceedings of the IEEE, vol. 92, No. 11, pp. 1780-1788, 2004.

* cited by examiner

PHYSICAL HUMAN-ROBOT INTERACTION (PHRI)

CROSS-REFERENCE TO RELATED APPLICATIONS

This application claims the benefit of U.S. Provisional Patent Application, Ser. No. 62/899,933 entitled LEARNING WHOLE-BODY HUMAN-ROBOT HAPTIC INTERACTION IN SOCIAL CONTEXTS, filed on Sep. 13, 2019; the entirety of the above-noted application(s) is incorporated by reference herein.

BACKGROUND

Physical human-robot interaction (pHRI) may occur when humans and robots come into contact with one another. Different types of interactions may occur, such as hugging, hand shaking, high fiving, etc.

BRIEF DESCRIPTION

According to one aspect, a robot for physical human-robot interaction (pHRI) may include a number of sensors, a processor, a controller, an actuator, and a joint. The number of sensors may receive a corresponding number of sensor measurements. The processor may reduce a dimensionality of the number of sensor measurements based on temporal sparsity associated with the number of sensors and spatial sparsity associated with the number of sensors and generate an updated sensor measurement dataset. The processor may receive an action associated with a human involved in pHRI with the robot. The processor may generate a response for the robot based on the updated sensor measurement dataset and the action. The controller may implement the response via an actuator within a joint of the robot.

The processor may generate the response for the robot based on a Bayesian Interaction Primitives (BIP) model. The BIP model may be approximated using a Monte Carlo Ensemble. The processor may reduce the dimensionality of the number of sensor measurements based on a weighted linear combination of one or more time-dependent basis functions. A basis space for one or more time-dependent basis functions may be calculated via Orthogonal Least Squares (OLS). The processor may reduce the dimensionality of the number of sensor measurements based on temporal sparsity associated with the number of sensors by masking data associated with sensors during time periods when the sensors are not triggered. The processor may reduce the dimensionality of the number of sensor measurements based on spatial sparsity associated with the number of sensors determined based on mutual information. The sensors of the number of sensors may be force sensors providing force measurements. The sensors of the number of sensors may be motion sensors providing motion measurements. The updated sensor measurement dataset may be generated by performing feature selection from the sensor measurements.

According to one aspect, a method for pHRI may include receiving a number of sensor measurements from a corresponding number of sensors, reducing a dimensionality of the number of sensor measurements based on temporal sparsity associated with the number of sensors and spatial sparsity associated with the number of sensors and generating an updated sensor measurement dataset, receiving an action associated with a human involved in pHRI with a robot, generating a response for the robot based on the updated sensor measurement dataset and the action, and implementing the response via an actuator within a joint of the robot.

The method for pHRI may include generating the response for the robot based on a Bayesian Interaction Primitives (BIP) model. The BIP model may be approximated using a Monte Carlo Ensemble. The method for pHRI may include reducing the dimensionality of the number of sensor measurements based on a weighted linear combination of one or more time-dependent basis functions, calculating a basis space for one or more time-dependent basis functions based on Orthogonal Least Squares (OLS), reducing the dimensionality of the number of sensor measurements based on temporal sparsity associated with the number of sensors by masking data associated with sensors during time periods when the sensors are not triggered, and/or reducing the dimensionality of the number of sensor measurements based on spatial sparsity associated with the number of sensors determined based on mutual information. The sensors of the number of sensors may be force sensors providing force measurements. The sensors of the number of sensors may be motion sensors providing motion measurements.

According to one aspect, a system for physical human-robot interaction (pHRI) may include a number of sensors, a processor, a controller, an actuator, and a joint. The number of sensors may receive a corresponding number of sensor measurements. The processor may reduce a dimensionality of the number of sensor measurements based on temporal sparsity associated with the number of sensors and spatial sparsity associated with the number of sensors and generate an updated sensor measurement dataset. The processor may receive an action associated with a human involved in pHRI with a robot. The processor may generate a response for the robot based on the updated sensor measurement dataset and the action. The controller may implement the response via an actuator within a joint of the robot.

DETAILED DESCRIPTION

Figure 1:
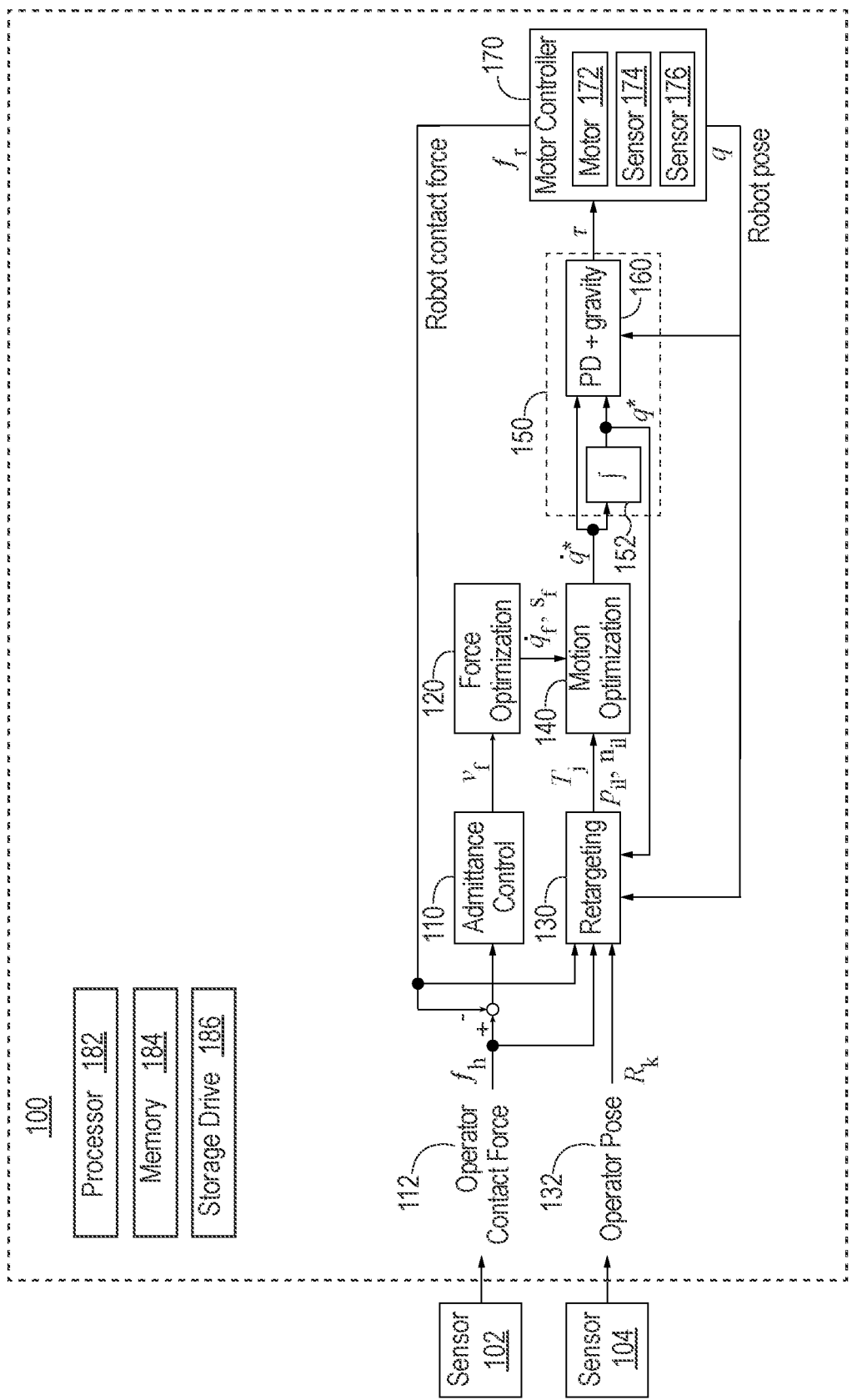
FIG. 1 is an exemplary component diagram of a robot or system for physical human-robot interaction (pHRI), according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a bus that interconnects components inside a robot using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "robot system", as used herein, may be any automatic or manual systems that may be used to enhance robot performance. Exemplary robot systems include a motor system, an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a suspension system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an exemplary component diagram of a robot or system for physical human-robot interaction (pHRI), according to one aspect. The robot or system for pHRI may receive inputs from sensors 102, 104 worn by an operator. According to one aspect, the system for pHRI may include an admittance controller 110, a force optimization controller 120, a retargeting controller 130, a motion optimization controller 140, a tracking controller 150, a motor controller, a processor 182, a memory 184, and a storage drive 186. The tracking controller 150 may include an integrator 152 and a proportional-derivative (PD) controller 160.

The motor controller may operate a motor 172 equipped with a number of sensors, such as sensors 174, 176. Although the robot of FIG. 1 is merely described with sensor 174 as a single force sensor and sensor 176 as a single motion sensor, multiple sensors may be implemented. The motor 172 may be an actuator, which may include a joint. According to one aspect, the sensor 102 may measure an operator contact force $f_h$ 112, the sensor 104 may measure an operator pose $R_k$ 132 (e.g., the pose of the operator, operator arms, etc.) and/or operator motion, the sensor 174 may measure a robot contact force $f_r$, and the sensor 176 may measure a robot pose q and/or robot motion.

The sensor 102 and the sensor 174 may be force sensors. In this way, the operator contact force $f_h$ may be measured by the force sensor 102 attached to an operator of the robot and the force sensor and the force sensor 174 attached to the robot may measure the robot contact force $f_r$ as one or more force measurements. Sensor 174 attached to the robot may measure human movement as one or more motion measurements. In this way, the sensors or number of sensors of the robot for pHRI may receive a corresponding number of sensor measurements (e.g., force sensor measurements, motion sensor measurements, etc.). Further, other types of sensors may be utilized, such as proximity sensors, accelerometers, pressure sensors, touch sensors, tilt sensors, etc.

pHRI

During a training phase, samples of pHRI may be collected and utilized to build a Bayesian Interaction Primitives (BIP) model. During an execution phase, the BIP model may be utilized or implemented to generate responses to forces sensed by the robot. The BIP model may be stored on the storage drive 186 and/or memory 184 during implementation.

Because the robot may be equipped with a plurality of sensors (e.g., a first force sensor, a second force sensor, a third force sensor, a fourth force sensor, etc.), computations associated with all of the sensor measurement data may be complex. It will be appreciated that any of the sensors 102, 104, 174, 176 may each be implemented as a plurality of sensors rather than a single sensor. For example, during the training phase, bi-directional interactions may be measured by respective sensors 102, 104, 174, 176. In other words, as the robot applies a force to the human, in return the human may apply a force to the robot (and vice versa). Similarly, as the human moves, the robot may move in response (and vice versa). As the number of sensors increases, the dimensionality of the data may increase due to the larger number of sensors (e.g., sensors 102, 104, 174, 176 may each be implemented as a plurality of sensors), thereby resulting in additional computational complexity. A larger model may utilize greater processing power and be more time consuming to compute.

Accordingly, during the training phase, a learning-from demonstration (LfD) framework for teaching pHRI social interactions that involve whole-body haptic interaction, (i.e., direct human-robot contacts potentially taking place anywhere on the robot body) may be implemented when the sensors 102, 104, 174, 176 receive sensor data or sensor measurements, respectively. Sensors 102, 104, 174, 176 may receive whole-body haptic information, including both kinesthetic and tactile information, which may be utilized to build a model enabling intimate haptic interactions as the arms may be often occluded from view of cameras or image capture devices and touch may be one of the only valid source of information on the timing and intensity of contacts. In hugging, for example, each person or hug participant feels the other's hugging force at the chest and back, and may adjust the arm joint torques to match the force applied to the other participant through the whole arms. Because the robot may utilize LfD, the robot may be capable of acting safely and comfortably for the human partner or 'partner' during pHRI.

Challenges associated with using continuous-time tactile information for learning haptic interactions may include high data dimensionality and temporal and/or spatial sparsity. For example, whole-body tactile sensing may utilize hundreds of sensors to cover a wide area to mitigate gaps in coverage. In this regard, the processor 182 may perform feature selection from the sensor measurements to reduce a dimensionality associated with the number of sensor measurements based on temporal sparsity associated with the number of sensors and spatial sparsity associated with the number of sensors and generate an updated sensor measurement dataset. This may be achieved, for example, by masking data associated with sensors during time periods when the sensors are not triggered or masking data based on mutual information. Temporal sparsity for a set of sensors, for example, may mean that during a pHRI, which lasts 2 seconds, data measured by that set of sensors may be considered 'useful' merely during the 2 second pHRI, and not when there is no interaction occurring.

According to one aspect, the processor 182 may reduce the dimensionality associated with the number of sensor measurements based on temporal sparsity by using non-uniform distribution of basis functions, which will be described in greater detail below. Explained in slightly greater detail, the processor 182 may reduce the dimensionality of the number of sensor measurements based on a weighted linear combination of one or more time-dependent basis functions, as will be described in greater detail herein. A basis space for one or more time-dependent basis functions may be calculated via Orthogonal Least Squares (OLS). In this way, the processor 182 may 'trim' data to generate the updated sensor measurement dataset using the non-uniform distribution basis functions to reduce the number of parameters provided to the retargeting controller 130 or other controllers (e.g., 110), for example. Stated again, the robot for pHRI may utilize temporal sparsity in an advantageous manner by employing the non-uniform distribution of basis functions to reduce the dimensionality of the latent space that represents the demonstrated interactions.

One effect of dense sensor placement may be that the data of individual sensors tends to be both temporally and spatially sparse because tactile information may be relevant when the robot and human partner are in contact, and many of the sensors may not see any contact during a specific pHRI interaction. Spatial sparsity, for a set of 60 sensors, for example, may mean that during a pHRI, merely data measured by 5 of the set of sensors may be considered 'useful' during the pHRI. The processor 182 may reduce the dimensionality associated with the number of sensor measurements based on spatial sparsity by using mutual information. Mutual information, for example, may include inputs and outputs, such as human motion and the force applied by the human to the robot (e.g., contact force $f_h$) or forces that robot are to apply to the human (e.g., contact force $f_r$). In other words, a change in an input which results in a change in the output may be considered among the mutual information or a correlation between the input and the output. Explained yet another way, the robot for pHRI may utilize spatial sparsity in an advantageous manner by considering mutual information to choose the relevant tactile sensors such that the dependency between the input and output force measurements may be maximized.

Therefore, the robot for pHRI may reduce computational complexity and lessen the effect of tactile information on the model than that of kinesthetic information by implementing feature selection via the processor 182 to reduce the dimensionality of high-dimensional, sparse tactile information. According to one aspect, a hand-crafted feature, such as a maximum force value within a predefined tactile sensor group may be utilized for inferences.

The processor 182 may receive an action associated with a human involved in pHRI with the robot based on the updated sensor measurement dataset. The processor 182 may generate a response for the robot based on the updated sensor measurement dataset and the received action. This response for the robot may be generated based on a Bayesian Interaction Primitives (BIP) model, which may be approximated using a Monte Carlo Ensemble. The BIP model may be indicative of or be used to model the spatiotemporal relationship between the tactile and kinesthetic information during whole-body haptic interactions from the training phase, thereby enabling the robot to learn whole-body human-robot haptic interaction in association with social contexts. The BIP model may be capable of predicting both an appropriate robotic response (e.g., joint trajectories) as well as the contact forces that should be exerted by the robot, given observations of the partner's pose and the force currently being exerted on the robot by the partner. Stated another way, the BIP model may model the joint spatiotemporal relationship between the poses and forces of the robot and partner. This relationship or BIP model may be learned from a set of training demonstrations as a source of prior knowledge for the pHRIs during the training phase.

Bayesian Interaction Primitives (BIP) Model

An interaction Y may be defined as a time series of D-dimensional sensor observations over time, $Y_{1:T} = [y_1, \ldots, y_T] \in \mathbb{R}^{D \times T}$. The D dimensions include both observed degrees of freedom (DoFs) from the human partner and controlled DoFs from the robot.

Basis Function Decomposition

In order to decouple the size of the state space from the number of observations, transform the interaction Y into a time-invariant latent space via basis function decomposition. Each dimension $d \in D$ of Y may be approximated with a weighted linear combination of time-dependent basis functions: $[y_1^d, \ldots, y_t^d] = [\Phi_{\Phi_1}{}^d w^d + \varepsilon_y]$, where $\Phi_{\Phi(t)}{}^d \in \mathbb{R}^{1 \times B^d}$ may be a row vector of Bd basis functions, $w^d \in \mathbb{R}^{B^d \times 1}$, and $\varepsilon_y$ may be i.i.d. Gaussian noise. This may be a linear system and the weights $w_d$ may be found through simple linear regression. The full latent model may be composed of the aggregated weights from each dimension, $w = [w^{1T}, \ldots, w^{DT}] \in \mathbb{R}^{1 \times B}$ where $B = \Sigma_d{}^D B^d$, and denote the transformation from latent model to observations as $y_t = h(\emptyset(t), w)$. Replace the time dependency of the basis functions with a linearly interpolated relative phase value $\emptyset(t)$, such that $\emptyset(t)$ lies in the range [0, 1] with the domain $t \in [0, T]$.

Spatiotemporal Bayesian Inference

Generally, BIP seeks to infer the underlying latent model w of an interaction while considering a prior model $w_0$ and a partial sequence of observations, $Y_{1:t}$, such that $\emptyset(t) < 1$ and T may be unknown. Given that T may be not known, infer both the phase associated with the observations, $\emptyset(t)$, as well as the phase velocity $\emptyset(t)$—how quickly the interaction may be progressing. Estimate of the underlying latent model contains correlated uncertainties between the individual weights, due to a shared error in the phase estimate. This may be because a temporal error induces a correlated error in spatial terms due to the phase dependency of the basis functions.

Probabilistically, this may be represented with an augmented state vector $s = [\emptyset, \dot\emptyset, w]$ and the following definition:

$$p(s_t|Y_{1:t},s_0) \propto p(y_t|s_t) p(s_t|Y_{1:t-1},s_0) \quad (A)$$

Following the ensemble variant of BIP, ensemble BIP, the posterior density in Eq. (A) may be approximated with a Monte Carlo ensemble which may be updated as a two-step recursive filter: one step to propagate the samples forward in time according to the interaction dynamics (prediction), and another to update the samples based on observed measurements (update). The ensemble members may be generally sampled from the prior distribution $p(s_0)$ such that $X_{(t-1|t-1)} = [x^1, \ldots, x^E]$. Instead, the initial ensemble may be obtained directly from the transformed demonstrations:

$$x_0^j = \left[0, \frac{1}{T_j}, w_j\right], 1 \le j \le E \quad (B)$$

where E denotes the number of demonstrations, and $w_j$ and $T_j$ may be the latent model and length of the j-th demonstration respectively. After each update step, the joint position and contact force references sent to the robot may be computed by:

$$\hat{y}_t = h\left(\frac{1}{E} \sum_{j=1}^{E} x_{(t|t-1)}^j\right) \quad (C)$$

Feature Selection

One difficulty in working with full-body haptic modalities may be that the dimension of the state space tends to increase dramatically. A large state space may be undesirable because it can increase the error in higher-order statistics that may be not tracked and increase the number of ensemble members required to track the true distribution, which may negatively impact computational performance and increase the minimum number of training demonstrations provided.

Haptic modalities may be sparse, both temporally and spatially, and this may be utilized to reduce the state dimension. For temporal sparsity, the force sensors may relay useful information merely at the time of contact; the time periods before and after may be not informative and may not be approximated. In terms of spatial sparsity, some sensors may not experience contact at all depending on the specific pHRI. For example, a hugging motion where both of the partner's arms wrap under the robot's arms may register different contact forces than if the arms wrap over. Furthermore, this can vary between person to person as physical characteristics such as height influence contact location and strength.

To utilize temporal sparsity, the processor 182 may employ a non-uniform distribution of basis functions across a sub-region of the phase domain. The basis space may be calculated via Orthogonal Least Squares (OLS), as the space may be functionally equivalent to a 1-layer Radial Basis Function network except for the lack of a bias value. This enables a reduction in the number of required basis functions while adequately covering the informative interaction periods.

Spatial sparsity, however, utilizes a different approach because it is unknown which sensors will be useful for a given interaction in advance. The processor 182 may employ a feature selection method based on mutual information to maximize the dependency between the input and output force sensor DoFs. There may be a limited set of training demonstrations available which may be selected based on continuous state variables (e.g., basis function coefficients). However, this may be addressed through binning, Knearest neighbors, or Parzen windows, for example. The processor 182 may employ mutual information estimation based on binning and incrementally select features until there may be no significant improvement in mutual information, based on a desired threshold (e.g., >0:07). In this way, mutual information may be utilized rather than other standard measures as some of the force sensors experience false positives due to deformation caused by the robot's own movements. Further, a layout of the robot may be considered. By considering the physical layout of the robot, the processor 182 may further reduce the state dimension of the inputs. Generally, tactile sensors may have a limited sensing range and may be used in large groups to provide greater surface coverage. However, when a human exerts a contact force to this region it does not matter whether it activated the first or the tenth sensor of a group, just that force was exerted on this region. This enables a reduction in an entire group of force sensors to a single DoF by taking the maximum force value of all the sensors in that group at any given point in time.

At run-time or during the execution phase, the robot may be presented with observations of a human partner and, utilizing both the prior knowledge (e.g., the BIP model) and the current observations or inputs from sensors on the robot, infers the next partner actions, and the corresponding appropriate robot response. The spatiotemporal relationship model of the BIP model allows inference of both the robot's poses and forces from those of the partner, allowing responsive behavior to be generated not only to discernable movements but also indiscernible ones, such as the strength of the hug. According to one aspect, release timing for a hug may be adjusted based on partner contact information detected by the touch sensor behind the neck. The motor controller 170 may implement the response via an actuator or motor 172 within a joint 210 of the robot 100.

Motion Retargeting

According to one aspect, the robot or system for pHRI may perform motion retargeting. The predicted joint trajectories and contact forces may be then sent to a motion retargeting controller because the contact forces also depend on the partner's body size and shape. For example, the operator may have an object in front of him or her and the robot may have a corresponding object located similarly. In other words, there may be an object on the operator side environment that the operator may touch. On the robot side environment, there may be another object (e.g., which may be a human or may be an inanimate object) that the robot may come in contact with or touch, corresponding to the operator side environment. In teleoperation, the motion and force commands may be given by the operator. Due to differences between the bodies of the operator and robot, the command motion and force may or may not be feasible on the robot (e.g., operator size and shape, robot size and shape, mechanical limits of the robot, etc.).

According to one aspect, teleoperation may occur where the sensor equipped operator may interact with a static object, such as a mannequin to provide an input motion and force references. One or more of the controllers described herein may receive the reference motion, reference force, a current robot state (e.g., pose), contact forces, etc. as inputs and output joint torques corresponding to the operator's contact forces, while preserving expression and style of the operator's motion. This may be achieved via motion retargeting, force optimization, and motion optimization.

Any of the controllers 110, 120, 130, 140, 150, 170, etc. may be implemented as an integrated circuit, an external device, a separate device from the other controllers, and may each include a processor, memory, storage drive, bus, etc. or be implemented via the processor 182, the memory 184, and the storage drive 186.

The admittance controller 110 may receive the operator contact force $f_h$ and the robot contact force $f_r$ and may calculate a desired velocity $v_f$ based on the operator contact force $f_h$ and the robot contact force $f_r$. The admittance controller 110 may calculate the desired velocity $v_f$ based on admittance control. The desired velocity $v_f$ may be a velocity of a contact point to be generated in order to realize the same contact force as the operator side.

The retargeting controller 130 may receive the operator pose $R_k$, the robot pose q, a robot trajectory q*, the operator contact force $f_h$, and the robot contact force $f_r$ and may calculate a transformation matrix $T_j$ which maps a human contact state to a robot contact state based on the operator pose $R_k$, the robot pose q, the robot trajectory q*, the operator contact force $f_h$, and the robot contact force $f_r$. The retargeting controller 130 may calculate the transformation matrix $T_j$ based on motion reference offset. While motion optimization attempts to realize the operator's pose, different contact states may occur on the operator side and on the robot side environments.

For example, if the operator is touching an object on the operator side environment, but the robot is not touching a corresponding object, then the robot may be retargeted by the retargeting controller 130 to move one or more robot arms closer together in order to touch the corresponding object in front of the robot on the robot side environment because taking the same or an identical pose as the operator may not result in the same kinematic relationship between the corresponding object at the robot side environment as on the operator side environment. In this way, the retargeting controller 130 may calculate or compute an adjusted robot pose based on the transformation matrix $T_j$, thereby resulting in identical contact states between the robot and the operator. This transformation matrix $T_j$ may be determined based on an operator body size, a robot body size, a size of the object, a size of the corresponding object, a length of a limb of the operator, a length of a limb of the robot, a shape of the body of the operator, a shape of the body of the robot, mechanical limits associated with the robot, etc. The retargeting controller 130 may implement or execute a finite state machine (FSM).

In this way, the retargeting controller 130 may resolve any discrepancies between the contact states of the operator and the robot (e.g., which may include a robot arm, motor or actuator, joint, etc.), including those associated with different kinematic parameters and body shapes.

According to one aspect, the force optimization controller 120 may realize the operator contact force $f_h$ measured by the sensor 102. According to one aspect, force control may be prioritized over motion tracking because matching the force profile may create a more realistic physical interaction.

The force optimization controller 120 may receive the desired velocity $v_f$ and may calculate a least square solution $q_f$ to $J_f^+ \hat{v}_f$ based on the desired velocity $v_f$. $J_f^+$ may be a Moore-Penrose pseudoinverse of $J_f$. $J_f$ is a Jacobian matrix of positions of contact points with respect to joint positions.

The force optimization controller 120 may calculate a scaling factor $s_f$ based on a current joint position $q_j$ of a joint of the robot.

The motion optimization controller 140 may receive the least square solution $q_f$, the scaling factor $s_f$, and the transformation matrix $T_j$, and may calculate a first trajectory $\dot{q}^*$ based on the least square solution $q_f$, the scaling factor $s_f$, and the transformation matrix $T_j$. This trajectory $\dot{q}^*$ may be associated with a joint velocity that realizes the force command but also comes as close as possible to the operator pose (e.g., realizing the operator pose). The motion optimization controller 140 may relax the least square solution $q_f$ based on the scaling factor $s_f$. In this way, the motion optimization controller 140 may relax the least square solution $q_f$ based on minimizing tangential motion.

According to one aspect, the motion optimization controller 140 may calculate the first trajectory $\dot{q}^*$ based on an inequality constraint associated with a position of a force sensor. Specifically, the motion optimization controller 140 and the force optimization controller 120 may generate the joint command τ to reproduce the contact force and motion of the operator to the greatest extent possible.

The tracking controller 150 may receive the first trajectory $\dot{q}^*$ and the robot pose q, calculate the robot trajectory q* based on the first trajectory $\dot{q}^*$, and calculate a joint command τ based on the robot trajectory q* and the robot pose q. The robot trajectory q* may be fed back to the retargeting controller 130.

The motor controller may implement the joint command τ at the joint of the robot. The joint command τ may include a joint torque for the joint of the robot. The joint of the robot may include an actuator, a flotational joint, a hydraulic cylinder, other joint, etc. As seen in FIG. 1, the robot contact force $f_r$ measured by the force sensor 174 may be fed back to the admittance controller 110 and the retargeting controller 130. The robot pose q measured by the sensor 176 may be fed back to the tracking controller 150 and/or the PD controller 160 and the retargeting controller 130.

As previously discussed, the inputs to the system for pHRI may include:

$f_h \in R^M$: contact forces measured by M force sensors attached to the operator;

$f_r \in R^M$: contact forces measured by the force sensors attached to the robot;

$ER_k$ (k=1, 2, . . . , K): orientations of the K IMUs (IMU, as used herein, may be a sensor, such as sensor 102, 104, etc.) attached to the operator, represented in an East-North-Up (ENU) frame; and $q \in R^N$: joint positions of the robot where N is the degrees of freedom (DoF) of the robot.

The output of the system for pHRI may include the robot's joint torque command $\tau \in R^N$.

Each of the M force sensors attached to the operator may be associated with a set of force sensors on the robot placed at topologically similar locations. If the set contains multiple force sensors, the sum of the measurements of those sensors may be used in $f_r$. As a result, $f_h$ and $f_r$ have the same number of elements that are ordered such that corresponding sensors have the same index in the respective vectors. A pair of corresponding force sensors on the operator and robot may be referred to as a force sensor pair.

The tracking controller 150 may calculate the joint torques τ to track the optimized joint positions $q^* \in R^N$ and velocities $\dot{q}^* \in R^N$ by the PD controller 160 and gravity compensation according to:

$$\tau = K_p(q^*-q) + K_d(\dot{q}^*-\dot{q}) + g(q) \tag{1}$$

where $K_p \in R^{N \times N}$ and $K_d \in R^{N \times N}$ may be user-specified, positive-definite gain matrices and g(q) may give the gravity compensation torque at q.

One goal of force optimization may be to match $f_r$ to $f_h$. m(≤M) may denote the number of force sensor pairs of which at least one is in contact, and $c_i$ may denote the index of i-th force sensor pair. The desired velocity $v_f$ of the force sensor $c_i$ may be calculated along its normal vector by admittance control:

$$\hat{v}_{fc_i} = k_f(f_{hc_i} - f_{rc_i}), (i=1,2, \ldots ,m) \tag{2}$$

where $k_f$ (>0) may be a user-defined constant gain. With this velocity, the robot may push the contact surface when a human force sensor measurement is larger than that of the corresponding robot force sensor.

In general, the velocity of a force sensor along its normal vector may be computed from the joint velocities as:

$$v_{fk} = n_k^T J_{Pk} \dot{q}, (k=1,2, \ldots ,M) \tag{3}$$

where $J_{Pk} \in R^{3 \times N}$ is the Jacobian matrix of the position of the k-th force sensor with respect to the joint positions, and $n_k \in R^3$ is the normal vector.

According to one aspect, computing the joint velocities that realize the desired force sensor velocity may be achieved by solving a constrained optimization problem:

$$q_f = \underset{\dot{q}}{\operatorname{argmin}} (\hat{v}_f - J_f \dot{q})^T T (\hat{v}_f - J_f \dot{q}) \tag{4}$$

subject to:

$$\underline{\dot{q}} \leq \dot{q} \leq \overline{\dot{q}} \tag{5}$$

where $$\hat{v}_f = (\hat{v}_{fc_1} \hat{v}_{fc_2} \ldots \hat{v}_{fc_m})^T \in R^m \tag{6}$$

$$J_f = \begin{pmatrix} n_{c_1}^T J_{Pc_1} \\ \vdots \\ n_{c_m}^T J_{Pc_m} \end{pmatrix} \in R^{m \times N} \tag{7}$$

The lower and upper bounds in Eq. (5) may be determined for joint j (j=1, 2, . . . , N) as follows:

$$\underline{\dot{q}_j} = \max\{-\dot{q}_{maxj}, (q_{minj} - q_j)/\Delta t\} \tag{8}$$

$$\overline{\dot{q}_j} = \min\{-\dot{q}_{maxj}, (q_{minj} - q_j)/\Delta t\} \tag{9}$$

where $q_j$ may be the current joint position, $q_{min\ j}$ and $q_{max\ j}$ are the minimum and maximum joint positions respectively, $\dot{q}_{max\ j}$ (>0) may be the mechanical joint velocity limit, and $\Delta t$ is the controller cycle time.

The calculation for the least-square solution may be:

$$\dot{q}_f^0 = J_f^+ \hat{v}_f \tag{10}$$

where $J_f^+$ is the Moore-Penrose pseudoinverse of $J_f$. The maximum scaling factor sf (≤1) such that $\dot{q}_f = s_f \dot{q}_f^0$ satisfies Eq. (5) may be computed. The scaling factor may be computed by:

$$s_f = \min_{j \in [1,N]} \max\{\min\left(1, \frac{\underline{\dot{q}_j}}{\dot{q}_{fj}^0}\right), \min\left(1, \frac{\overline{\dot{q}_j}}{\dot{q}_{fj}^0}\right)\} \tag{11}$$

where $\dot{q}_{fj}^0$ is the j-th element of $\dot{q}_f^0$. $s_f \geq 0$ as long as all joint positions are within their ranges. If $s_f = 0$, moving the sensor toward the direction in accordance with admittance control may not be feasible without incurring tangential movement.

In this way, motion retargeting and robot control for teleoperated physical human-robot interaction (pHRI) may be provided.

With respect to motion optimization, the motion optimization controller 140 may compute the desired link angular velocities $\hat{\omega}_m$ from the operator's limb orientations measured by IMUs or sensors. The k-th IMU or sensor may be attached to the frame of joint j(k). The reference orientation for joint j(k), $^0\hat{R}_{j(k)}$, may be computed by:

$$^0\hat{R}_{j(k)} = ^0R_E {^E}R_k {^k}R_{j(k)} \tag{12}$$

where $^0R_E$ may be the orientation of the ENU frame represented in the world frame in which the robot model is defined and $^kR_{j(k)}$ may be the relative orientation between the IMU or sensor and joint frames. $^kR_{j(k)}$ may be constant throughout the motion and its value offline may be determined by obtaining IMU or sensor measurements when the robot and operator take the same pose. The desired velocity for link j(k), $\hat{\omega}_{mj(k)} \in R^3$, may be computed by:

$$\hat{\omega}_{mj(k)} = k_m s({}^0 R_{j(k)}, {}^0 \hat{R}_{j(k)}) \tag{13}$$

where $k_m$ may be a user-defined constant gain, ${}^0 R_{j(k)}$ may be the current orientation, and $s(R_1, R_2)$ may be a function that computes a sin θ where (a, θ) represents the equivalent angle-axis representation of the rotation from $R_1$ to $R_2$. $\hat{\omega}_{mj(k)}$ (k=1, 2, . . . , K) may be concatenated to obtain the desired link velocity vector $\omega_m \in R^{3K}$. Additionally, the Jacobian matrix $J_m \in R^{3K \times N}$ may be obtained by concatenating the Jacobian matrix of the orientation of every joint with respect to the joint positions.

Motion optimization may be considered as:

$$\dot{q}^* = \underset{\dot{q}}{\operatorname{argmin}} \{ (\hat{\omega}_m - J_m \dot{q})^T (\hat{\omega}_m - J_m \dot{q}) + w_q \dot{q}^T \dot{q} \} \tag{14}$$

subject to Eq. (5) and $$\underline{v_f} \leq J_f \dot{q} \leq \overline{v_f} \tag{15}$$

where $w_q$ may be a user-defined weight for the regularization term. The optimal joint positions q* may be calculated by the integrator 152 by numerically integrating $\dot{q}^*$.

Defining $\hat{v}_{fi}$ as the i-th element of $\hat{v}_f$, the upper and lower bounds in Eq. (15) are determined as:

$$\overline{v_{fi}} = \max\{s_f \hat{v}_{fi}, \hat{v}_{fi}\} \tag{16}$$

$$\underline{v_{fi}} = \min\{s_f \hat{v}_{fi}, \hat{v}_{fi}\} \tag{17}$$

if at least the operator sensor of pair i is in contact, and $$\overline{v_{fi}} = s_f \hat{v}_{fi} \tag{18}$$

$$\underline{v_{fi}} = -\infty \tag{19}$$

If only the robot is in contact, Eq. (19) may be utilized because the robot should move away from the human if the operator motion is in the same direction. If only the operator sensor is in contact, on the other hand, the robot should avoid contacting the human too hard.

The bounds of Eq. (16) and Eq. (17) relax the force control requirement by allowing the motion optimization controller 140 to select a solution from an area rather than along a line segment. This relaxation enables selection of a solution that does not incur tangential movement, if desired. At the same time, the motion optimization controller 140 may determine a solution that satisfies Eq. (3) within joint velocity limits.

With respect to the motion retargeting controller 130, there are generally four possible contact state combinations for each force sensor pair:

contact state 1) both are not in contact contact state 2) only the operator side is in contact with the object contact state 3) only the robot side is in contact with corresponding object contact state 4) both are in contact with their respective objects The motion retargeting controller 130 may resolve the contact state discrepancy in the cases of contact state 2) and contact state 3), and to mitigate the robot from encountering contact state 2) and contact state 3). The controller may merely use contact force information already available for force control, although vision or depth information may be utilized to estimate the shape of the interaction target. However, in intimate interactions, potential contact locations, such as the person's back are often not visible from onboard cameras or depth sensors, and thus, the calculations of the motion retargeting controller 130 may be primarily based on merely contact force and/or pose information, as previously discussed.

Eq. (3) may work towards resolving the contact state discrepancy. In contact state 2), the robot moves the force sensor (which is not in contact) towards the human because $f_{hc_i} > f_{rc_i} = 0$, while in contact state 3) the robot moves away from the human because $f_{rc_i} > f_{hc_i} = 0$. However, the robot cannot make contact instantly in contact state 2), and the robot may continually alternate between non-contact and contact states in 3) if motion optimization drives the robot toward the human, which is likely because the operator has not made a contact yet. In this regard, motion reference offset and an additional inequality constraint may be applied during motion optimization by the motion optimization controller 140.

Motion reference offset is aimed at tweaking the reference joint orientations obtained from IMU measurements such that the robot is more likely to realize the same contact state as the operator in the future. One transformation matrix may be stored for each IMU (e.g., sensor) and update all matrices of the IMUs in the same limb as the force sensor pair that transitioned from contact state 2) to contact state 4). ${}^0 \hat{R}_{j2}$ may denote the reference orientation of joint j when a force sensor on the operator side made a contact. In contact state 2), the corresponding force sensor on the robot has not touched the human at this point. Due to the controller prioritizing force over motion, the robot will gradually move toward the human. Assuming that the operator maintains the contact with the mannequin, the robot will eventually come to contact and enter contact state 4). ${}^0 R_{j4}^*$ may denote the orientation of the joint j frame computed using the current optimal joint positions q*. A coordinate transformation that maps ${}^0 \hat{R}_{j2}$ to ${}^0 R_{j4}^*$ may be desired in order to realize the same contact state when the human initially made the contact, the transformation matrices are updated as:

$${}^0 T_j = {}^0 R_{j4}^* * {}^0 \hat{R}_{j2}^T \tag{20}$$

which may be used to modify the reference orientation in Eq. (12) as:

$${}^0 \hat{R}_j' = {}^0 T_j {}^0 \hat{R}_j \tag{21}$$

An additional inequality constraint may be added to the motion optimization formulation when a force sensor pair transitions from contact state 3) to contact state 1) in order to mitigate scenarios where the robot from makes undesired contact. If the robot makes a contact when the operator has not, the controller pulls the robot away from the human and transitions to contact state 1). $p_{i1}$ and $n_{i1}$ may denote the position and normal vector, respectively, of the force sensor at contact state 1). The new inequality constraint used in addition to Eqs. (5) and (15) may be:

$$n_{i1}^T J_{Pi} \dot{q} \leq \frac{1}{\Delta t} n_{i1}^T (p_{i1} - p_i) \tag{22}$$

where $p_i$ may be the current position of the sensor. This constraint enables a "wall" to be created which the sensor should not pass through in order not to touch the human. Because the human's body has curves, this constraint may be local to the particular contact point. Thus, the constraint may be removed once the corresponding sensor on either side makes a new contact.

Figure 2:
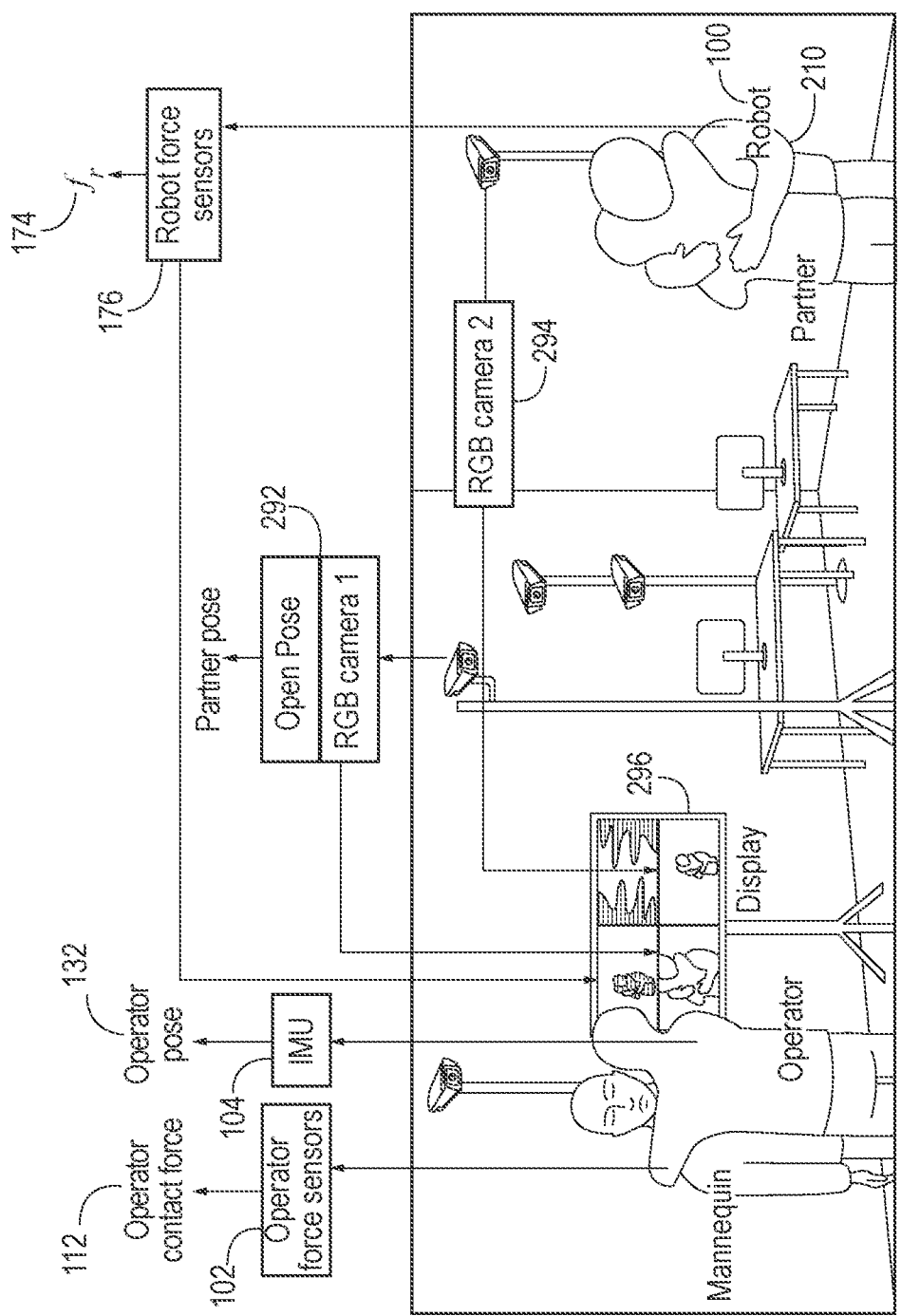
FIG. 2 is an exemplary implementation of the robot or system for physical human-robot interaction (pHRI) of FIG. 1, according to one aspect.

FIG. 2 is an exemplary implementation of the robot or system for physical human-robot interaction (pHRI) of FIG. 1, according to one aspect. For example, an operator or a human may have sensors 102, 104 affixed to him or her, these sensors may be force sensors, inertial measurement units (IMUs), etc. to measure the pose and the contact force associated with the operator as he or she hugs the mannequin. These sensors 102, 104 may provide measurements indicative of the contact force 112 that the operator applies to the mannequin as well as the operator pose 132. These inputs 112, 132 may be fed to the admittance controller 110 and the retargeting controller 130 of the robot 100. A first camera 292 may receive a video feed of the robot 100 engaged in pHRI with a partner and the processor 182 may process the feed using an OpenPose (e.g., a real time system for multi-person pose detection) to generate a pose of the partner. A second camera 294 may receive a second video feed of the robot 100 engaged in pHRI with a partner and the processor 182 may process the feed to supplement generation of the pose of the partner. A display 296 may display one or more of the results associated with the pose and the robot for pHRI. Using the data or measurements from any of the sensors 102, 104, 174, 176, during the training phase, feature selection may be performed as described above, and the BIP model may be built accordingly. In this way, the operator may 'teach' the robot 100 how to interact or conduct pHRI with humans. The motor controller 170 may implement calculated or determined responses via an actuator or motor 172 within a joint 210 of the robot 100, such as the elbow joint. It will be appreciated that the motor controller 170 may implement the calculated or determined responses for joints other than joint 210 of the robot 100, such as fingers, shoulders, knees, ankles, etc.

Figure 3:
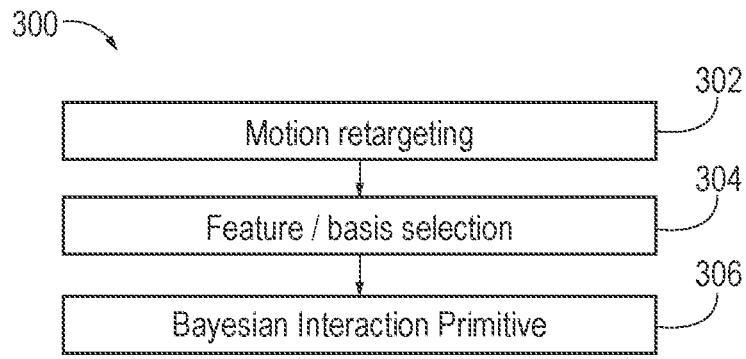
FIG. 3 is an exemplary flow diagram of a method for physical human-robot interaction (pHRI), according to one aspect.

FIG. 3 is an exemplary flow diagram of a method 300 for pHRI, according to one aspect. The method 300 of FIG. 3 may be implemented during a training phase, and include observing 302 one or more interactions between a human and a robot or observing pHRIs, collecting data from the pHRIs and performing feature basis selection 304 to reduce the dimensionality of the dataset associated with the measured sensor data, and building a BIP model 306 which may be utilized during an execution phase for a robot for pHRI.

Figure 4:
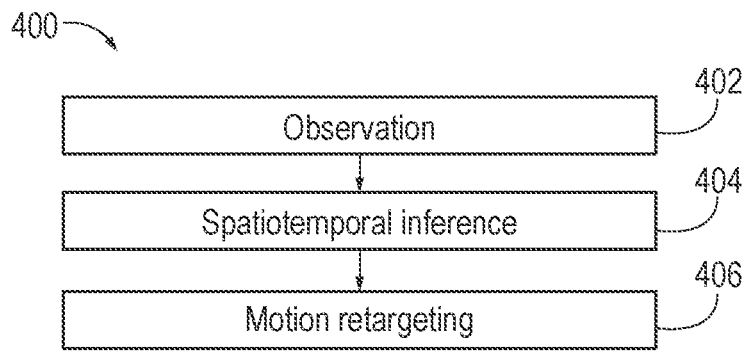
FIG. 4 is an exemplary flow diagram of a method for physical human-robot interaction (pHRI), according to one aspect.

FIG. 4 is an exemplary flow diagram of a method 400 for pHRI, according to one aspect. The method 400 for pHRI may be implemented during an execution phase, where observations 402 may be utilized to generate spatiotemporal inferences 404 using the BIP model built at 306. Further, motion retargeting 406 may be applied by the robot 100.

Figure 5:
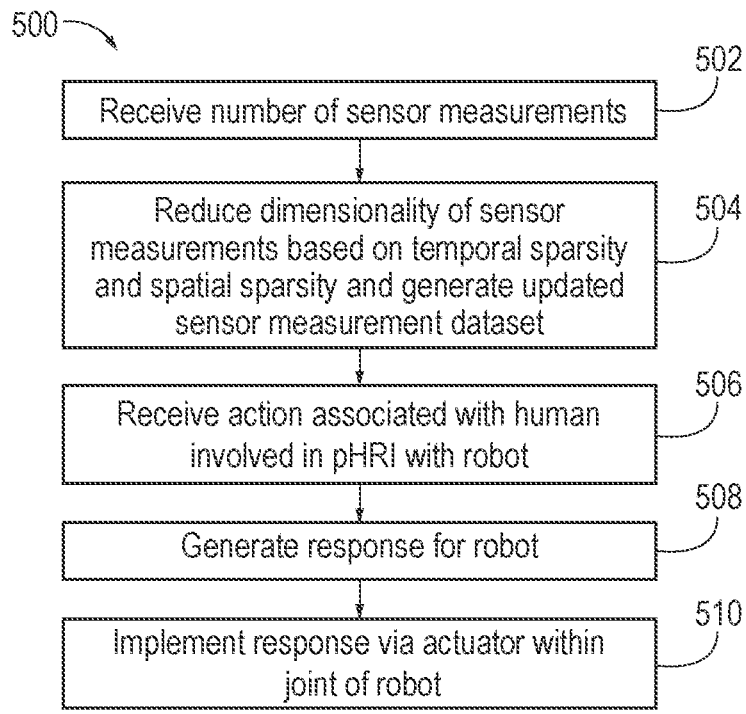
FIG. 5 is an exemplary flow diagram of a method for physical human-robot interaction (pHRI), according to one aspect.

FIG. 5 is an exemplary flow diagram of a method 500 for pHRI, according to one aspect. The method 500 for pHRI may include receiving 502 a number of sensor measurements from a corresponding number of sensors, reducing 504 a dimensionality of the number of sensor measurements based on temporal sparsity associated with the number of sensors and spatial sparsity associated with the number of sensors and generating an updated sensor measurement dataset, receiving 506 an action associated with a human involved in pHRI with a robot, generating a response 508 for the robot based on the updated sensor measurement dataset and the action, and implementing 510 the response via an actuator within a joint of the robot.

Figure 6:
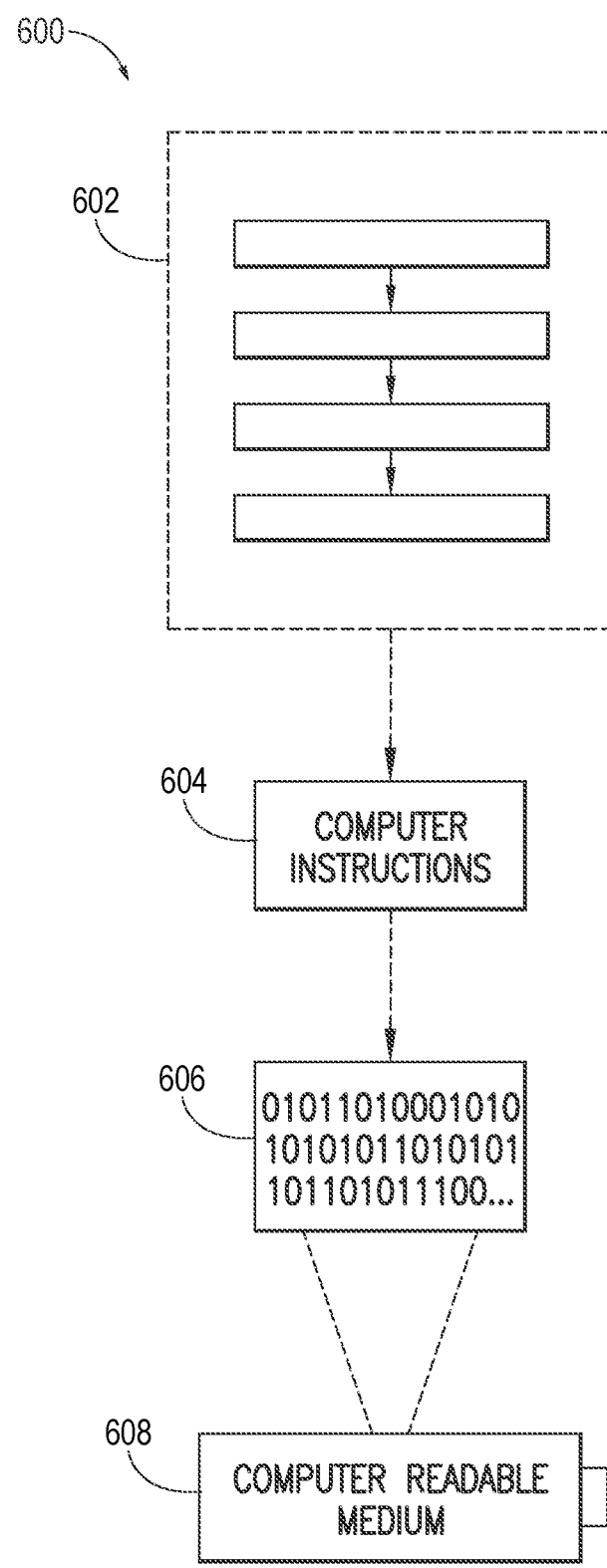
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3, the method 400 of FIG. 4, or the method 500 of FIG. 5. In another aspect, the processor-executable computer instructions 604 may be configured to implement a system, such as the system or robot 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
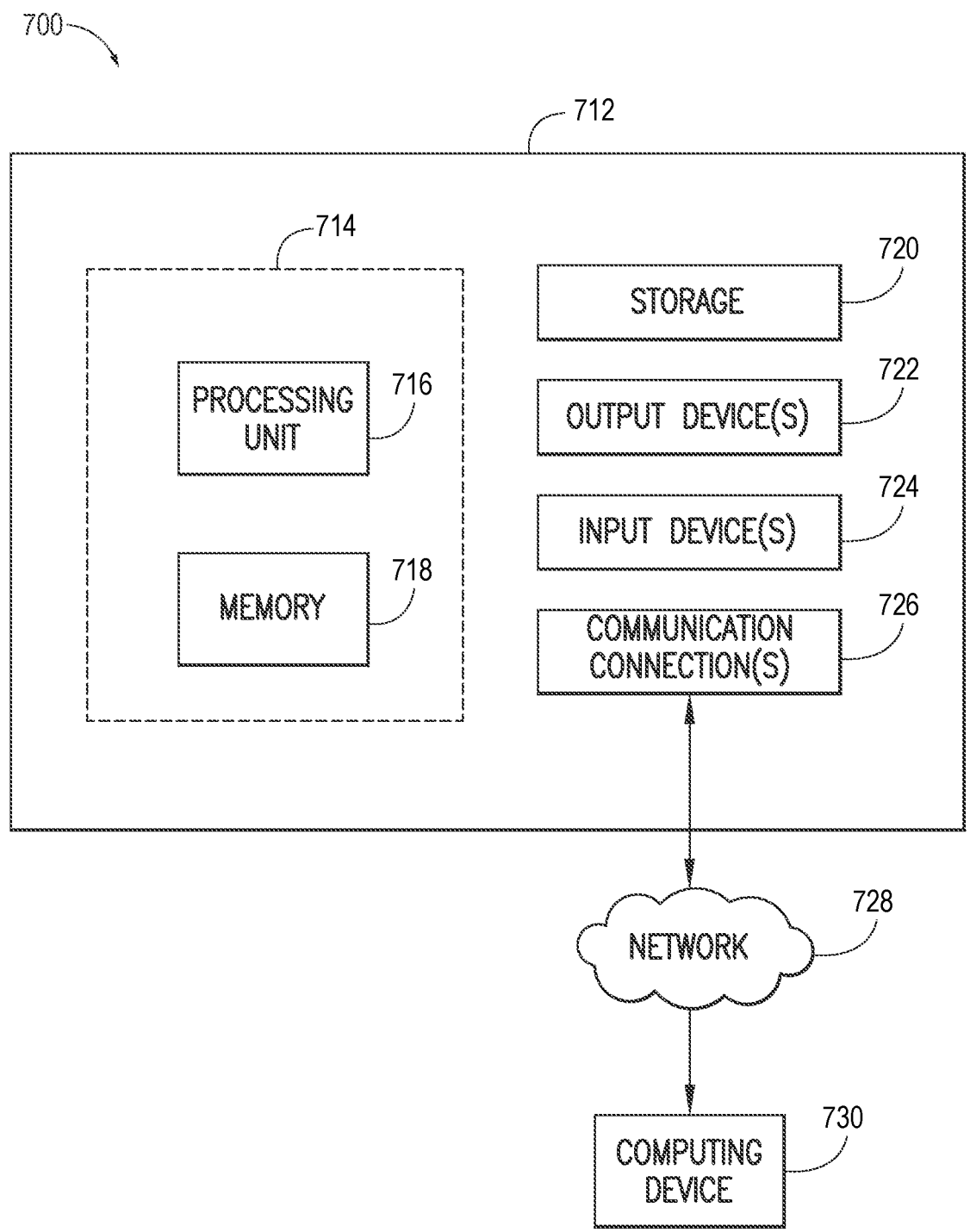
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A robot for physical human-robot interaction (pHRI), comprising:
   a number of sensors receiving a corresponding number of sensor measurements;
   a processor reducing a dimensionality of the number of sensor measurements based on temporal sparsity associated with the number of sensors and spatial sparsity associated with the number of sensors and generating an updated sensor measurement dataset,
   wherein the processor receives an action associated with a human involved in pHRI with the robot,
   wherein the processor generates a response for the robot based on the updated sensor measurement dataset and the action; and
   a controller implementing the response via an actuator within a joint of the robot,
   wherein temporal sparsity is indicative of useful data from the sensor measurements over a period of time associated with the pHRI utilized to generate the response for the robot, and
   wherein spatial sparsity is indicative of useful data from a subset of the number of sensor measurements utilized to generate the response for the robot.

2. The robot for pHRI of claim 1, wherein the processor generates the response for the robot based on a Bayesian Interaction Primitives (BIP) model.

3. The robot for pHRI of claim 2, wherein the BIP model is approximated using a Monte Carlo Ensemble.

4. The robot for pHRI of claim 1, wherein the processor reduces the dimensionality of the number of sensor measurements based on a weighted linear combination of one or more time-dependent basis functions.

5. The robot for pHRI of claim 4, wherein a basis space for one or more time-dependent basis functions is calculated via Orthogonal Least Squares (OLS).

6. The robot for pHRI of claim 1, wherein the processor reduces the dimensionality of the number of sensor measurements based on temporal sparsity associated with the number of sensors by masking data associated with sensors during time periods when the sensors are not triggered.

7. The robot for pHRI of claim 1, wherein the processor reduces the dimensionality of the number of sensor measurements based on spatial sparsity associated with the number of sensors determined based on mutual information.

8. The robot for pHRI of claim 1, wherein the sensors of the number of sensors are force sensors providing force measurements.

9. The robot for pHRI of claim 1, wherein the sensors of the number of sensors are motion sensors providing motion measurements.

10. The robot for pHRI of claim 1, wherein the updated sensor measurement dataset is generated by performing feature selection from the sensor measurements.

11. A method for physical human-robot interaction (pHRI), comprising:
receiving a number of sensor measurements from a corresponding number of sensors;
reducing a dimensionality of the number of sensor measurements based on temporal sparsity associated with the number of sensors and spatial sparsity associated with the number of sensors and generating an updated sensor measurement dataset;
receiving an action associated with a human involved in pHRI with a robot;
generating a response for the robot based on the updated sensor measurement dataset and the action; and
implementing the response via an actuator within a joint of the robot,
wherein temporal sparsity is indicative of useful data from the sensor measurements over a period of time associated with the pHRI utilized to generate the response for the robot, and
wherein spatial sparsity is indicative of useful data from a subset of the number of sensor measurements utilized to generate the response for the robot.

12. The method for pHRI of claim 11, comprising generating the response for the robot based on a Bayesian Interaction Primitives (BIP) model.

13. The method for pHRI of claim 12, wherein the BIP model is approximated using a Monte Carlo Ensemble.

14. The method for pHRI of claim 11, comprising reducing the dimensionality of the number of sensor measurements based on a weighted linear combination of one or more time-dependent basis functions.

15. The method for pHRI of claim 14, comprising calculating a basis space for one or more time-dependent basis functions based on Orthogonal Least Squares (OLS).

16. The method for pHRI of claim 11, comprising reducing the dimensionality of the number of sensor measurements based on temporal sparsity associated with the number of sensors by masking data associated with sensors during time periods when the sensors are not triggered.

17. The method for pHRI of claim 11, comprising reducing the dimensionality of the number of sensor measurements based on spatial sparsity associated with the number of sensors determined based on mutual information.

18. The method for pHRI of claim 11, wherein the sensors of the number of sensors are force sensors providing force measurements.

19. The method for pHRI of claim 11, wherein the sensors of the number of sensors are motion sensors providing motion measurements.

20. A system for physical human-robot interaction (pHRI), comprising:
a number of sensors receiving a corresponding number of sensor measurements;
a processor reducing a dimensionality of the number of sensor measurements based on temporal sparsity associated with the number of sensors and spatial sparsity associated with the number of sensors and generating an updated sensor measurement dataset,
wherein the processor receives an action associated with a human involved in pHRI with a robot,
wherein the processor generates a response for the robot based on the updated sensor measurement dataset and the action associated with the human; and
a controller implementing the response via an actuator within a joint of the robot,
wherein temporal sparsity is indicative of useful data from the sensor measurements over a period of time associated with the pHRI utilized to generate the response for the robot, and
wherein spatial sparsity is indicative of useful data from a subset of the number of sensor measurements utilized to generate the response for the robot.

* * * * *